R. T. Crane,
Drilling Gas Fittings.
No. 100,731. Patented Mar. 15, 1870.
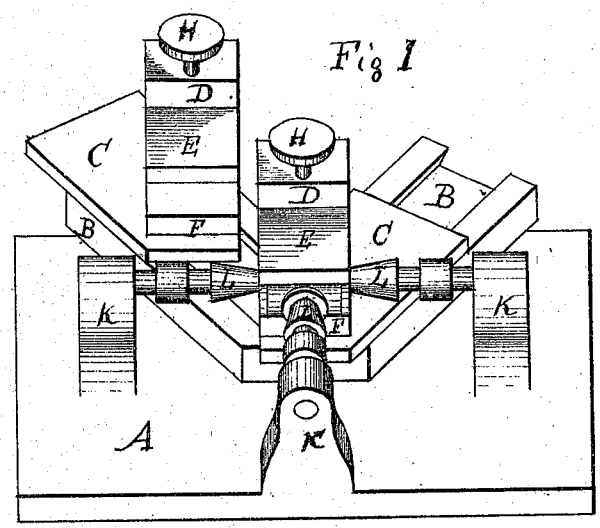
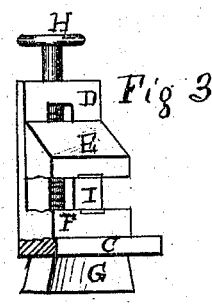
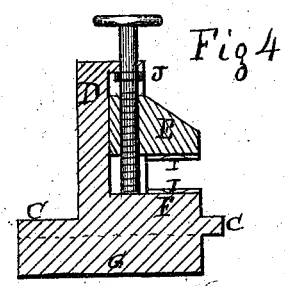
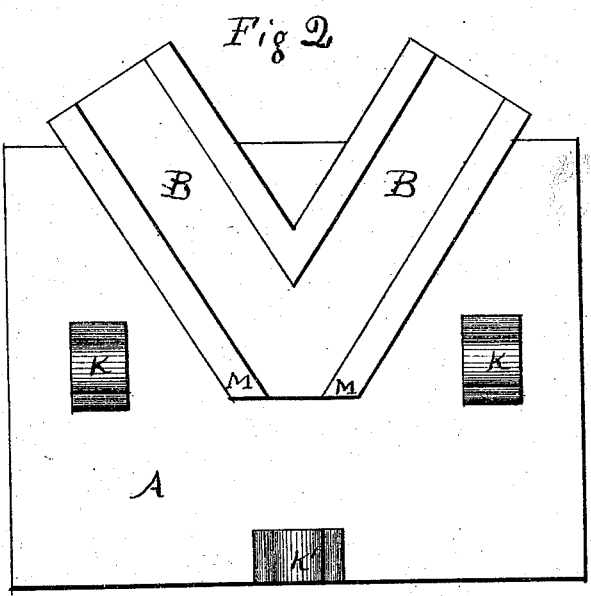
Witnesses
L. L. Bond
Geo. W. Bond
Richard T. Crane,
Inventor

United States Patent Office.

RICHARD T. CRANE, OF CHICAGO, ILLINOIS.

Letters Patent No. 100,731, dated March 15, 1870.

---

IMPROVEMENT IN MACHINES FOR DRILLING AND TAPPING GAS-FITTINGS.

---

The Schedule referred to in these Letters Patent and making part of the same.

---

To all whom it may concern:

Be it known that I, RICHARD T. CRANE, of the city of Chicago, in the county of Cook, and State of Illinois, have invented certain new and useful Improvements in Chucks; and I do hereby declare that the following is a full, clear, and exact description thereof, reference being had to the accompanying drawings making a part of this specification, in which—

Figure 1 is an isometric view;

Figure 2, a plan view of the base with vises removed;

Figure 3, a perpendicular view of one vise detached; and

Figure 4, a vertical section of the same.

Like letters refer to the same parts in all of the figures.

The nature of my invention consists in the combination of two movable chucks or vises for holding gas or steam-fittings, and presenting the same to the drilling or tapping-tools with two or more drills or taps, in such a manner that, on the withdrawal of one chuck with its drilled or tapped fitting from the drilling or tapping tools, the other chuck, being in readiness with another fitting, may be moved and accurately guided into the same position as that from which the first chuck had just been removed.

To enable others skilled in the art to make and use my improved chuck I will describe its construction and operation.

In the drawings—

A represents the platform or bed of the machine, either as may be desired in construction.

B B represent the guides or run-ways of the vises.

C C, the beds upon which the vises are placed.

D D, the posts or standards of the vises.

E, the upper, and F, the lower jaws of the vise.

I, the space between them, cut away so as to conform to the configuration of the fitting.

D, the dovetailed projections fitting the guide-ways B.

H, the screw, by which the jaw E is elevated or depressed, so as to disengage or hold the fittings.

J, the collar, by means of which the screw H is held in place when pressure is obtained.

K K represent standards or posts, by or through which proper taps or drills are inserted, and L, taps or drills which are operated by any suitable machinery.

Machines of this class are usually made entirely of iron, and the chuck can be placed upon the bed-plate of the entire machine, or upon its own bed or platform, as may be desired. The guide-ways B are placed on this bed, and at angles sufficient to allow the two vises to pass each other without interference.

The dovetailed projection G fits into the groove of the guide B and slides therein, and when placed in position for tapping or drilling the front end strikes against the point M, which operates as a stop to and holds the vise in exact position. The guide-ways being at an angle with the line of pressure from the taps or drills, the vise will remain in position when three taps are used, but when one or two are used a back stop will be required.

The plates C are fitted over the guide-ways, and the dovetailed projections G beneath them run nearly or quite their entire length. Near the front end of each the standards D are placed. To these standards the jaws E and F are attached, the lower one, F, permanently, and the upper one movably.

The faces of these jaws are fitted to conform to the piece of metal inserted, and for any considerable variation in the size of the pieces to be tapped or drilled, I usually change the vises, but the lower jaw may be made adjustable, if desired, so that the same vise can be used in all kinds of work.

In lifting the jaw E the screw H rests upon its lower end, and in depressing it the pressure is upon the collar J.

These vises, when in place, stand square with the machine, as shown at fig. 1, and as they slide without much friction in the guide-ways, they are easily operated by any suitable handle or knob attached to the back of the posts D or to the plates C.

By the use of this chuck the machine is kept steadily at work, as, while the fitting in one vise is being tapped, one previously tapped is taken from the other and a fresh blank inserted, when the one at the tap is withdrawn, and the other slid forward into position to receive the taps, and so on as long as the machine continues to run.

When the plate or bed a is placed in a vertical position, and the tap in the part K is in a vertical position, as such machines are sometimes made, then it will be advisable to operate the separate vises of the chuck with suitable foot-levers.

Having thus fully described my improved chuck,

What I claim as new, and desire to secure by Letters Patent, is—

The combination of two or more drilling or tapping-tools with two chucks or vises, and guide-ways for the same, converging in such manner that the chucks may be alternately guided by them to one and the same position in relation to the tools, substantially as described.

RICHARD T. CRANE.

Witnesses:
L. L. BOND.
O. W. BOND.